United States Patent
Nomura et al.

(10) Patent No.: US 11,978,907 B2
(45) Date of Patent: May 7, 2024

(54) POSITIVE ELECTRODE FOR LITHIUM SECONDARY BATTERY, WINDING ELEMENT FOR LITHIUM SECONDARY BATTERY, AND LITHIUM SECONDARY BATTERY

(71) Applicant: Samsung SDI Co., Ltd., Yongin-si (KR)

(72) Inventors: Keisuke Nomura, Yokohama (JP); Hironobu Fukahori, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 545 days.

(21) Appl. No.: 15/999,103

(22) PCT Filed: Feb. 16, 2017

(86) PCT No.: PCT/KR2017/001720
§ 371 (c)(1),
(2) Date: Aug. 17, 2018

(87) PCT Pub. No.: WO2017/142328
PCT Pub. Date: Aug. 24, 2017

(65) Prior Publication Data
US 2021/0028462 A1 Jan. 28, 2021

(30) Foreign Application Priority Data
Feb. 19, 2016 (JP) .................................. 2016-030398
Sep. 19, 2016 (KR) ...................... 10-2016-0119205

(51) Int. Cl.
*H01M 4/62* (2006.01)
*H01M 10/0525* (2010.01)
*H01M 4/02* (2006.01)

(52) U.S. Cl.
CPC ....... *H01M 4/623* (2013.01); *H01M 10/0525* (2013.01); *H01M 2004/028* (2013.01)

(58) Field of Classification Search
CPC ...... H01M 4/623; H01M 4/364; H01M 4/625; H01M 10/0525
See application file for complete search history.

(56) References Cited

U.S. PATENT DOCUMENTS

2004/0234850 A1* 11/2004 Watarai ................. H01M 4/623
252/182.1
2010/0196756 A1* 8/2010 Wakita ............. H01M 10/0567
429/199

(Continued)

FOREIGN PATENT DOCUMENTS

CN 103066296 A * 4/2013
JP 2010-278455 A 12/2010

(Continued)

OTHER PUBLICATIONS

Japanese Office Action for corresponding Japanese Patent Application No. 2016-030398, dated Jul. 6, 2020, 3 pages.

(Continued)

*Primary Examiner* — Osei K Amponsah
(74) *Attorney, Agent, or Firm* — Lewis Roca Rothgerber Christie LLP (57) ABSTRACT

Disclosed are a positive electrode for a lithium secondary battery, a winding element for a lithium secondary battery, and a lithium secondary battery, wherein the positive electrode includes a positive active material and a mixing binder including a first binder, a second binder, and a third binder, the first binder includes at least one selected from copolymers including polyvinylidene fluoride, acid-modified polyvinylidene fluoride, and acid-modified polyvinylidene fluoride, and the mixing binder includes the first binder at a (Continued)

proportion of 30 wt % to 60 wt % relative to the total weight of the mixing binder, and has a tensile modulus of 200 MPa to 600 MPa.

6 Claims, 1 Drawing Sheet

(56) References Cited

U.S. PATENT DOCUMENTS

| | | | |
|---|---|---|---|
| 2011/0223456 A1 | 9/2011 | Sugaya et al. | |
| 2011/0318638 A1 | 12/2011 | Koh et al. | |
| 2014/0127563 A1* | 5/2014 | Kim | H01M 4/62 429/211 |
| 2014/0162139 A1 | 6/2014 | Hoshiba et al. | |
| 2015/0050555 A1 | 2/2015 | Fukumine et al. | |
| 2015/0083975 A1* | 3/2015 | Yeou | H01M 4/13 252/506 |
| 2015/0137028 A1 | 5/2015 | Ichisaka et al. | |
| 2015/0179996 A1* | 6/2015 | Inaba | H01M 50/489 429/249 |
| 2015/0200399 A1* | 7/2015 | Yeou | H01M 4/131 252/500 |
| 2015/0280241 A1 | 10/2015 | Hara et al. | |
| 2016/0329566 A1 | 11/2016 | Jung et al. | |
| 2016/0336587 A1 | 11/2016 | Jung et al. | |
| 2018/0269484 A1 | 9/2018 | Kobayashi et al. | |

FOREIGN PATENT DOCUMENTS

| | | |
|---|---|---|
| JP | 2011-146252 A | 7/2011 |
| JP | 2012-146590 A | 8/2012 |
| JP | 2015-109154 A | 6/2015 |
| JP | 2015-149225 A | 8/2015 |
| KR | 10-2014-0074176 A | 6/2014 |
| KR | 10-2014-0142694 A | 12/2014 |
| KR | 10-2015-0033439 A | 4/2015 |
| KR | 10-2015-0083726 A | 7/2015 |
| KR | 10-2016-0039835 A | 4/2016 |
| KR | 10-2016-0040125 A | 4/2016 |
| KR | 10-1625348 B1 | 5/2016 |
| WO | 2011/002097 A1 | 1/2011 |
| WO | WO 2011/052126 A1 | 5/2011 |
| WO | 2013/176093 A1 | 11/2013 |
| WO | WO 2014/050653 A1 | 4/2014 |
| WO | 2017/056974 A1 | 4/2017 |

OTHER PUBLICATIONS

Japanese Office Action dated Dec. 2, 2019, for corresponding Japanese Patent Application No. 2016-030398 (4 pages).
Japan Patent Office, Notice of Allowance issued in corresponding Japanese Patent Application No. 2016-030398, dated Jan. 4, 2021, 3 pages.

* cited by examiner

POSITIVE ELECTRODE FOR LITHIUM SECONDARY BATTERY, WINDING ELEMENT FOR LITHIUM SECONDARY BATTERY, AND LITHIUM SECONDARY BATTERY

CROSS-REFERENCE TO RELATED APPLICATION(S)

This application is a National Phase Patent Application of International Patent Application No. PCT/KR2017/001720, filed on Feb. 16, 2017, which claims priority of Japanese Patent Application No. 2016-030398, filed Feb. 19, 2016 and Korean Patent Application No. 10-2016-0119205, filed Sep. 19, 2016. The entire contents of all of which are incorporated herein by reference.

TECHNICAL FIELD

A positive electrode for a lithium secondary battery, a winding element for a lithium secondary battery, and a lithium secondary battery are disclosed.

BACKGROUND ART

Recently, as an information processor such as a mobile phone, a laptop, and the like has been down-sized, a non-aqueous electrolyte secondary battery as a power source for these information processors is being required of high energy density.

For example, Japanese Patent Laid-Open Publication No. 2012-146590 and No. 2015-109154 describe technology of improving characteristics (capacity, cycle characteristics, etc.) of the non-aqueous electrolyte secondary battery by making a positive active material layer have high density.

Specifically, Japanese Patent Laid-Open Publication No. 2012-146590 describes technology of mixing at least two kinds of active material particles having a different average particle diameter in a predetermined ratio and mixing carbon black and expanded graphite in a predetermined ratio, and Japanese Patent Laid-Open Publication No. 2015-109154 describes technology of making a composite of a particular conductive material on the surface of a positive active material particle and adjusting a tensile modulus of a binder within a particular range.

However, characteristics of the non-aqueous electrolyte secondary battery may not be sufficiently improved by simply making the positive active material layer have high density. Accordingly, a method of thickening the positive active material layer as well as making the positive active material layer have high density is being suggested.

However, when the positive active material layer is thickened as well as has high density, flexibility of the positive active material layer is reduced, and accordingly, a positive electrode may be damaged during manufacture of a winding-type non-aqueous electrolyte secondary battery. Particularly, as the positive electrode is closer to a center of a winding element for a lithium secondary battery, the positive electrode has a smaller curvature radius and thus may be easily damaged.

Accordingly, technology of improving characteristics of the non-aqueous electrolyte secondary battery as well as maintaining flexibility of the positive active material layer is strongly required.

Technology of securing flexibility of the positive active material layer by using a low elastic binder as a binder for a positive active material layer is being considered. However, the low elastic binder may deteriorate characteristics of the non-aqueous electrolyte secondary battery and particularly, cycle characteristics thereof. Accordingly, the low elastic binder may not improve characteristics of the non-aqueous electrolyte secondary battery, even though the positive active material layer is formed to be thick.

WO2011/052126 describes another method of securing flexibility of a positive active material by using binders having different elasticity as a binder included in a positive active material layer on the surface of a current collector and as another binder included in another positive active material layer on the other surface of the current collector, when the positive active material layers are formed on the surface and the other surface of the current collector. However, this method fails in fundamentally solving the above problem.

DISCLOSURE

Technical Problem

An embodiment provides a positive electrode for a lithium secondary battery capable of improving characteristics of a non-aqueous electrolyte secondary battery while maintaining flexibility of a positive active material layer.

Another embodiment provides a winding element for a lithium secondary battery including the positive electrode.

Yet another embodiment provides a lithium secondary battery including the positive electrode.

Technical Solution

According to an embodiment, a positive electrode for a lithium secondary battery includes a positive active material; and a mixing binder including a first binder, a second binder, and a third binder, wherein the first binder includes at least one selected from copolymers including polyvinylidene fluoride (PVdF), acid-modified polyvinylidene fluoride, and acid-modified polyvinylidene fluoride, and the mixing binder includes the first binder at a proportion of 30 wt % to 60 wt % relative to the total weight of the mixing binder, and has a tensile modulus of 200 MPa to 600 MPa.

The copolymer including the acid-modified polyvinylidene fluoride may include at least one monomer selected from the group consisting of tetrafluoroethylene (TFE), hexafluoro propylene (HFP), and chiorotrifluoroethylene (CTFE).

The second binder may be a hydrogenated acrylonitrile butadiene rubber (hydrogenated NBR). The mixing binder may include the second binder at a proportion of 10 wt % to 40 wt % relative to the total weight of the mixing binder.

The third binder may be a copolymer including vinylidene fluoride. The third binder may have a tensile modulus of 150 MPa to 600 MPa.

The copolymer including the vinylidene fluoride may be at least one selected from the group consisting of a vinylidene fluoride-tetrafluoroethylene copolymer, a vinylidene fluoride-hexafluoro propylene copolymer, a vinylidene fluoride-chlorotrifluoroethylene copolymer, a vinylidene fluoride-tetrafluoroethylene-hexafluoro propylene copolymer, a vinylidene fluoride-acrylate copolymer, a vinylidene fluoride-hexafluoro propylene-acrylate copolymer, a vinylidene fluoride-tetrafluoroethylene-acrylate copolymer, and a vinylidene fluoride-tetrafluoroethylene-hexafluoro propylene-acrylate copolymer.

According to another embodiment, a winding element for a lithium secondary battery including the positive electrode is provided.

According to another embodiment, a lithium secondary battery including the winding element for a lithium secondary battery is provided.

Advantageous Effects

The positive electrode for a lithium secondary battery according to an embodiment may improve characteristics of a lithium secondary battery while maintaining flexibility of a positive active material layer.

BEST MODE

Hereinafter, embodiments of the present invention are described in detail with reference to drawings. However, these embodiments are exemplary, the present invention is not limited thereto and the present invention is defined by the scope of claims.

On the other hand, constituent elements substantially having the same functional structure in the present specification and drawing are assigned by the same numeral and will not be repetitively illustrated.

<1. Structure of Non-Aqueous Electrolyte Secondary Battery>

Figure 1:
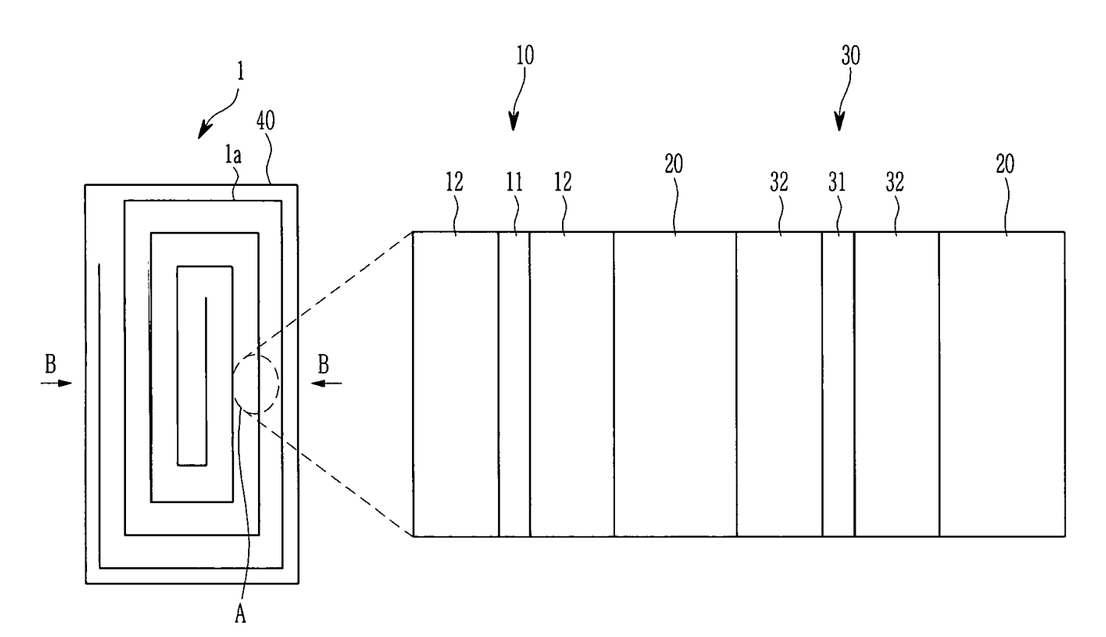
FIG. 1 is a schematic top cross-sectional view showing a structure of a lithium secondary battery according to an embodiment.

First, referring to FIG. 1, a structure of a lithium secondary battery according to an embodiment is described.

FIG. 1 shows a top cross-sectional view of a winding element 1a for a lithium secondary battery and an enlarged view of a region A of the winding element 1a for a lithium secondary battery.

The lithium secondary battery includes a winding element 1a for a lithium secondary battery, a non-aqueous electrolyte, and an external material 40.

The winding element 1a for a lithium secondary battery is manufactured by winding the electrode stack structure 100a obtained by sequentially stacking a belt-shaped positive electrode 10, a separator 20, a belt-shaped negative electrode 30, and a separator 20 in a length direction, and compressing the wound electrode stack structure in an arrow direction B. The stacking order of the constituent elements is not limited thereto.

The belt-shaped positive electrode 10 (hereinafter, a [positive electrode 10]) includes a positive current collector 11 and a positive active material layer 12.

The positive current collector 11 is not particularly limited, and may be for example aluminum (Al), stainless steel, nickel-plated steel, and the like.

The positive current collector 11 may be connected to a positive terminal.

The positive active material layer 12 includes a positive active material and a mixing binder and may further include a conductive material.

The positive active material may include any material reversibly intercalating and deintercalating lithium ions without any particular limit but, for example, lithium-containing transition metal oxide, nickel sulfide, copper sulfide, sulfur, iron oxide, vanadium oxide, and the like.

Examples of the lithium-containing transition metal oxide may be lithium cobalt oxide (LCO), lithium nickel oxide, lithium nickel cobalt oxide, lithium nickel cobalt aluminum oxide (hereinafter, referred to be [NCA]), lithium nickel cobalt manganese oxide (hereinafter, referred to be [NCM]), lithium manganese oxide, lithium iron phosphate, and the like. These positive active materials may be used alone or as a mixture of more than two.

The positive active material may be desirably the lithium-containing transition metal oxide, and particularly a lithium-containing transition metal oxide having a layered rock salt structure.

The positive active material may suppress a side-reaction with an electrolyte solution at a high voltage by surface-treating the above materials.

An average particle diameter of the positive active material may be 10 μm to 30 μm in terms of safety or charge property of the positive active material.

When the positive active material includes a secondary particle formed of assembled primary particles, the average particle diameter may be a particle diameter of the secondary particle. Herein, when the secondary particle of the assembled primary particles formed of the positive active material is regarded to be a sphere, the average particle diameter of the positive active material is a 50% cumulative value (D50) in a diameter distribution and may be measured in a laser diffraction scattering method.

A content (for example, a volume density) of the positive active material in the positive active material layer 12 is not particularly limited and may be any content applied to a positive active material layer of a conventional lithium secondary battery.

The mixing binder may bind the positive active material and a conductive material themselves and simultaneously the positive active material and the conductive material with the positive current collector 11.

The mixing binder may include at least first to third binders that will be described later. In this way, when the first to third binders are used as a mixture, flexibility of the positive active material layer 12 may not only be maintained, but characteristics of the lithium secondary battery 1 may also be improved.

The first binder may include at least one selected from copolymers including polyvinylidene fluoride (PVdF), acid-modified polyvinylidene fluoride, and acid-modified polyvinylidene fluoride.

The mixing binder may include the first binder at a proportion of 30 wt % to 60 wt % relative to the total weight of the mixing binder.

The acid-modified polyvinylidene fluoride is an acid-modified monomer and may include a monomer having a carboxyl group or a carbonic acid anhydride group such as acrylic acid, maleic acid or maleic anhydride, and the like.

In addition, the copolymer including the acid-modified polyvinylidene fluoride may include at least one monomer selected from the group consisting of tetrafluoroethylene (TFE), hexafluoro propylene (HFP), and chlorotrifluoroethylene (CTFE). For example, the copolymer including the acid-modified polyvinylidene fluoride may be an acid-modified PVdF-HFP copolymer.

The first binder may firmly bind a positive active material and a conductive material with the positive current collector 11. In other words, the first binder may increase a peel strength of the positive active material layer 12 with respect to the positive current collector 11. Particularly, an acid-modified type binder has a strong bonding force and reduces a total amount of a binder and accordingly, is appropriate for making the positive electrode 10 be thickened and have high density.

In addition, the first binder has high electrochemical stability and thus little deteriorates battery characteristics.

However, the first binder has smaller flexibility than that of the second and third binder, and accordingly, when the first binder is excessively used, flexibility of the positive active material layer 12 may be deteriorated. Considering this, the first binder may be appropriately included in the ratio in the mixing binder.

The second binder may be a hydrogenated acrylonitrile butadiene rubber (hydrogenated NBR).

The mixing binder may include the second binder at a proportion of 10 w % to 40 wt % relative to the total weight of the mixing binder.

The second binder may increase flexibility of the positive active material layer 12. In addition, the second binder has a high elongation property and thus may increase a binding force of a positive active material and a conductive material with the positive current collector 11 due to an anchor effect.

However, the second binder has lower electrochemical stability than the first binder, and accordingly when excessively used, battery characteristics may be deteriorated. Accordingly, the second binder is appropriately included in the ratio in the mixing binder.

The third binder may be a copolymer including vinylidene fluoride. In addition, the third binder may have a tensile modulus of 150 MPa to 600 MPa. According to an embodiment, the third binder may have a tensile modulus of 200 MPa to 350 MPa.

The mixing binder may include the third binder at a proportion of 15 wt % to 35 wt % relative to the total weight of the mixing binder.

The copolymer including vinylidene fluoride may be at least one selected from the group consisting of a vinylidene fluoride-tetrafluoroethylene (VdF-TFE) copolymer, a vinylidene fluoride-hexafluoro propylene (VdF-HFP) copolymer, a vinylidene fluoride-chlorotrifluoroethylene (VdF-CTFE) copolymer, a vinylidene fluoride-tetrafluoroethylene-hexafluoro propylene (VdF-TFE-HFP) copolymer, a vinylidene fluoride-acrylate copolymer, a vinylidene fluoride-hexafluoro propylene-acrylate copolymer, a vinylidene fluoride-tetrafluoroethylene-acrylate copolymer, and a vinylidene fluoride-tetrafluoroethylene-hexafluoro propylene-acrylate copolymer.

The third binder may increase flexibility of the positive active material layer 12.

In addition, the third binder is flexible but has high electrochemical stability. Accordingly, the third binder little deteriorates battery characteristics, even through used.

However, the third binder has a smaller elongation property than the second binder and thus has a low binding force due to the anchor effect. Accordingly, when the third binder is excessively used, a peel strength of the positive active material layer 12 with respect to the positive current collector 11 may be decreased.

However, when the first and second binders are mixed in a weight ratio within the aforementioned range, a weight ratio of the third binder may be included within an appropriate range.

When the mixing binder consists of the first to third binders, a wt % sum thereof is 100 wt %.

The mixing binder has a tensile modulus in a range of 200 MPa to 600 MPa and specifically in a range of 250 MPa to 450 MPa.

When the mixing binder satisfies the requirements, flexibility of the positive active material layer 12 may not only be maintained, but characteristics of the lithium secondary battery 1 may also be improved.

On the other hand, the first binder is harder than the second and third binders, and in an embodiment, a tensile modulus of the mixing binder is appropriately adjusted by mixing the second and third binders in an appropriate amount (specifically, in the above weight ratio) with the first binder.

In addition, a content of the mixing binder included in the positive active material layer 12 is not particularly limited but ranges in an amount of 0.3 wt % to 5 wt % and specifically, 0.5 wt % to 2 wt % based on a total weight of the positive active material layer 12.

When the amount of the mixing binder is included within the ranges, flexibility of the positive active material layer 12 may not only be maintained, but characteristics of the lithium secondary battery 1 may also be improved.

The conductive material may be for example carbon black such as ketjen black, acetylene black, and the like carbon black, natural graphite, artificial graphite, carbon nanotube, graphene, and the like, but has no particular limit if conductivity of a positive electrode is increased.

A thickness of the positive active material layer 12 is not particularly limited but may be at least an equivalent thickness to that of a conventional lithium secondary battery. In an embodiment, the positive active material layer 12 has excellent flexibility and may be made to be thicker than a conventional positive active material layer 12.

A porosity of the positive active material layer 12 is not particularly limited but may be 10 volume % to 20 volume %.

The separator 20, the belt-shaped negative electrode 30 (hereinafter, [negative electrode 30]), the electrolyte solution, and the exterior material may use anything in a general lithium secondary battery.

These are schematically described as follows.

The separator 20 is not particularly limited, and may be any separator used for a lithium secondary battery. For example, a porous film or a non-woven fabric showing excellent high-rate discharge performance and the like as a separator may be used alone or as a combination.

The separator may be coated with an inorganic material of $Al_2O_3$, $Mg(OH)_2$, $SiO_2$, and the like.

A material of the separator may be for example, a polyolefin-based resin such as polyethylene, polypropylene, and the like, a polyester-based resin such as polyethylene terephthalate, polybutylene terephthalate, and the like, polyvinylidene difluoride, a vinylidene fluoride-hexafluoro propylene copolymer, a vinylidene fluoride-perfluoro vinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, and the like.

A porosity of the separator is not particularly limited, and may have any porosity of a separator of a lithium secondary battery.

The negative electrode 30 includes a negative current collector 31 and a negative active material layer 32.

The negative current collector 31 may include, for example, copper (Cu), nickel (Ni), and the like.

The negative active material layer 32 may be any negative active material layer of a lithium secondary battery. For example, the negative active material layer 32 includes a negative active material, and may further include a binder for a negative electrode.

The negative active material may be for example, a graphite active material (artificial graphite, natural graphite, a mixture of artificial graphite and natural graphite, natural graphite coated with artificial graphite, etc.), silicon (Si) or tin (Sn), or a mixture of oxide particulates thereof and the graphite active material, silicon or tin particulates, an alloy including silicon or tin as a basic material, $Li_4Ti_5O_{12}$, a titanium oxide ($TiO_x$)-based compound, and the like. The silicon oxide may be represented by $SiO_x$ ($0 \leq x \leq 2$).

The negative active material may be for example metal lithium, and the like besides these materials.

The binder for the negative electrode may be for example polyvinylidene difluoride, an ethylene-propylene-diene terpolymer, a styrene-butadiene rubber (SBR), an acrylonitrile-butadiene rubber, a fluoro elastomer, polyvinyl acetate, polymethyl methacrylate, polyethylene, nitrocellulose, and the like.

The binder for the negative electrode may not be particularly limited if it binds the negative active material and the conductive material on the negative current collector 31.

A content of the binder for the negative electrode is not particularly limited, and may be any content of a negative active material layer of a lithium secondary battery.

The electrolyte solution may use a non-aqueous electrolyte of a conventional lithium secondary battery without a particular limit.

The electrolyte solution has a composition where an electrolytic salt in a non-aqueous solvent.

The non-aqueous solvent may be for example cyclic carbonate esters such as propylene carbonate, ethylene carbonate, butylene carbonate, chloroethylene carbonate, vinylene carbonate, and the like, cyclic esters such as γ-butyrolactone, γ-valero lactone, and the like, linear carbonates such as dimethyl carbonate, diethyl carbonate, ethylmethyl carbonate, and the like, linear esters such as methyl formate, methyl acetate, methyl butyrate, and the like, tetrahydrofuran or a derivative thereof, ethers such as 1,3-dioxane, 1,4-dioxane, 1,2-dimethoxyethane, 1,4-dibutoxyethane, methyl diglyme, and the like, nitriles such as acetonitrile, benzonitrile, and the like, dioxolane or a derivative thereof, ethylene sulfide, sulfolane, sultone, or a derivative thereof, which may be used singularly or as a mixture of two or more, without limitation.

The electrolytic salt may be, for example, an inorganic ion salt including lithium (Li), sodium (Na), or potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, KSCN and the like, an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4$N-maleate, $(C_2H_5)_4$N-benzoate, $(C_2H_5)_4$N-phtalate, lithium stearyl sulfonate, lithium octyl sulfonate, lithium dodecylbenzene sulfonate, and the like, and these ionic compounds may be used alone or in a mixture of two or more.

A concentration of the electrolytic salt may be the same as in a non-aqueous electrolyte of a conventional lithium secondary battery and is not particularly limited.

In an embodiment, an electrolyte solution may include an appropriate lithium compound (electrolytic salt) at a concentration of 0.5 mol/L to 2.0 mol/L.

The external material 40 may be for example an aluminum laminate or may be a metal-made external material.

<2. Method of Manufacturing Lithium Secondary Battery>

Hereinafter, a method of manufacturing the lithium secondary battery is described.

(Method of Manufacturing Belt-Shaped Positive Electrode)

The positive electrode 10 is for example manufactured by the following method.

First, the positive active material layer 12 is formed on positive current collector 11. That is, materials of the positive active material layer 12 are dispersed in an organic solvent or water to prepare positive electrode material active mass slurry and the positive electrode material active mass slurry is coated on the positive current collector 11 to form a coating layer.

Subsequently, the coating layer is dried. According to the process, the positive active material layer 12 is formed on the positive current collector 11.

The coating method is not particularly limited, and may be, for example, a doctor blade method, a slot die method, a knife coater method, a gravure coater method, and the like.

(Method of Manufacturing Belt-Shaped Negative Electrode)

The negative electrode 30 is for example manufactured as follows.

Materials of a negative active material layer are dispersed in a solvent (for example water) to prepare negative electrode material active mass slurry, and the negative electrode material active mass slurry is coated on a current collector to form a coating layer. Subsequently, the coating layer is dried and the dried coating layer is compressed with the negative current collector 31. According to the process, the negative electrode 30 is manufactured.

(Winding Element for Lithium Secondary Battery and Method of Manufacturing Battery)

The positive electrode 10, the separator 20, the negative electrode 30, and the separator 20 are sequentially stacked to manufacture an electrode stack structure. The electrode stack structure is wound to manufacture a winding element 1a for a lithium secondary battery. Subsequently, the winding element 1a for a lithium secondary battery is for example pressed in a direction of the arrow B to manufacture a flat winding element 1a for a lithium secondary battery.

Then, the flat winding element 1a for a lithium secondary battery is inserted with a non-aqueous electrolyte into an exterior housing body 40 (for example a laminate film) and the exterior housing body is sealed to manufacture a non-aqueous electrolyte secondary battery 1. Herein, the terminal communicating electricity with each current collector is protruded out of the exterior housing body.

The lithium secondary battery having a winding element for a lithium secondary battery is illustrated, and the present invention is not limited and may be for example, a stack-type lithium secondary battery such as cylindrical, prismatic, laminate-type, button type, and the like.

[Mode for Invention]

Hereinafter, examples of the present invention and comparative examples are described. These examples, however, are not in any sense to be interpreted as limiting the scope of the invention.

EXAMPLES

1. Example 1

A lithium secondary battery 1 according to Example 1 was manufactured according to the following process.

(1-1. Manufacture of Positive Electrode)

Lithium cobalt oxide, carbon black, and a mixing binder were dispersed in N-methyl pyrrolidone (NMP) in a weight ratio of a solid content of 97.8:1.2:1.0 to prepare positive electrode material active mass slurry.

The mixing binder included acrylic acid modified polyvinylidene fluoride (PVdF, a first binder), hydrogenated NBR (a second binder), and a vinylidene fluoride-tetrafluoroethylene-hexafluoro propylene (VdF-TFE-HFP) copolymer (a third binder) were included in a weight ratio of 0.4:0.3:0.3 as shown in Table 1.

Herein, a tensile modulus of the acrylic acid modified PVdF was 1200 MPa. In addition, a tensile modulus of the hydrogenated NBR was 180 MPa, a tensile modulus of the VdF-TFE-HFP copolymer was 250 MPa, and a tensile modulus of the mixing binder was 420 MPa.

Herein, the tensile modulus of each binder was measured in the following method.

First, the binder was prepared into a cast film, and this cast film was used to prepare a dumbbell-shaped specimen having a test width of 5 mm. Subsequently, the specimen was uniaxially elongated at 2 Mm/min with Autograph AGS-100NX made by Shimadzu Corp., and its stress and distortion value were measured. Based on the obtained measurements, its tensile modulus was calculated.

The positive electrode material active mass slurry was coated on both sides of a 12 μm-thick aluminum foil current collector. Subsequently, the coated current collector was compressed, so that the coating layer might have solid density of 4.1 g/cc to obtain the positive electrode 10.

Then, an aluminum lead wire was welded at the terminal end of the positive electrode.

(1-2. Manufacture of Negative Electrode)

Graphite, a styrene butadiene rubber (SBR), and a sodium salt of carboxylmethyl cellulose were dispersed in a water solvent in a weight ratio of a solid content of 98:1:1 to prepare negative electrode material active mass slurry.

Subsequently, the negative electrode material active mass slurry was coated on both sides of a 6 μm-thick copper foil current collector (a negative current collector 31) and dried to form a coating layer. Then, the dried coating layer was compressed to fabricate a negative electrode. Subsequently, a nickel lead wire was welded at the terminal end of a negative electrode 30.

(1-3. Manufacture of Winding Element for Lithium Secondary Battery)

The positive electrode, a separator (ND314, Asahi Kasei E-Materials Corp.), the negative electrode, and a separator were stacked in order and then wound in a length direction by using a wick having a diameter of 3 cm. The terminal ends were fixed with a tape, the wick was removed, and then, a flat winding element for a lithium secondary battery was manufactured by inserting a cylindrical electrode winding element for a lithium secondary battery between two sheets of 3 cm-thick metal plate and maintaining them for 3 seconds.

(1-4. Manufacture of Lithium Secondary Battery Cell)

A lithium secondary battery cell was manufactured by sealing under a reduced pressure the electrode winding element along with an electrolyte solution by a laminate film formed of three layers of polypropylene/aluminum/nylon with two lead wires out.

Herein, the electrolyte solution was prepared by dissolving 10 volume % of FEC (fluoroethylene carbonate) and 1.3 M of $LiPF_6$ in a solvent of ethylene carbonate/dimethyl carbonate mixed in a volume ratio of 3:7.

The lithium secondary battery cell was inserted between two sheets of 3 cm-thick metal plate heated at 90° C. and then, maintained there for 5 minutes.

The lithium secondary battery cell 1 was manufactured according to the following process.

(1-5. Flexibility Evaluation of Positive Electrode)

The positive electrode was bent with 180° to evaluate flexibility.

When the positive electrode had low flexibility, the positive current collector 11 was broken after bent with 180°, and when the positive current collector 11 was broken, the positive electrode was equally broken during the manufacture of a winding element for a lithium secondary battery.

Accordingly, whether or not the positive current collector 11 was broken was judged with naked eyes after bent with 180° (includes pinhole), and when broken was not judged, flexibility was evaluated as [0], and when broken was judged, flexibility was evaluated as [X].

On the other hand, when flexibility was [X], a battery cell was impossible to manufacture, and thus the following cycle test was not conducted.

(1-6. Cycle Test)

First, at the $1^{st}$ cycle, a lithium secondary battery cell was CC-CV charged (constant current constant voltage charged) up to a voltage of 4.4 V at 0.1 C and CC discharged (constant current discharged) down to a voltage of 2.75 V at 0.1 C. Subsequently, at the $2^{nd}$ cycle, the lithium secondary battery cell was CC-CV charged up to a voltage of 4.4 V at 0.2 C and CC discharged down to a voltage of 2.75 V at 0.2 C. In addition, after the $3^{rd}$ cycle, the lithium secondary battery cell was repetitively CC-CV charged up to a voltage of 4.4 V at 1.0 C and CC discharged down to a voltage of 3.00 V at 1.0 C.

A capacity retention was defined by dividing discharge capacity at the $300^{th}$ cycle by discharge capacity at the $3^{rd}$ cycle.

Flexibility and capacity retention results measured in the above methods are shown in Table 1.

2. Example 2

A lithium secondary battery cell was manufactured according to the same method as Example 1 except for changing the third binder into a VdF-acrylate copolymer (a tensile modulus: 200 MPa). Herein, a tensile modulus of a mixing binder was 400 MPa.

Flexibility and capacity retention of the lithium secondary battery cell were measured according to the same method as Example 1, and the results are shown in Table 1.

3. Example 3

A lithium secondary battery cell was manufactured according to the same method as Example 1 except for changing the first binder into an acrylic acid modified PVdF-HFP copolymer (a tensile modulus: 1100 MPa). Herein, a tensile modulus of a mixing binder was 350 MPa.

Flexibility and capacity retention of the lithium secondary battery cell were measured according to the same method as Example 1, and the results are shown in Table 1.

4. Example 4

A lithium secondary battery cell was manufactured according to the same method as Example 1 except for changing the weight ratio of the first, second, and third binders into 0.33:0.33:0.33. Herein, a tensile modulus of a mixing binder was 250 MPa.

Flexibility and capacity retention of the lithium secondary battery cell were measured according to the same method as Example 1, and the results are shown in Table 1.

5. Example 5

A lithium secondary battery cell was manufactured according to the same method as Example 1 except for changing the weight ratio of the first, second, and third binders into 0.5:0.35:0.15. Herein, a tensile modulus of a mixing binder was 250 MPa.

Flexibility and capacity retention of the lithium secondary battery cell were measured according to the same method as Example 1, and the results are shown in Table 1.

6. Example 6

A lithium secondary battery cell was manufactured according to the same method as Example 1 except for changing the weight ratio of the first, second, and third binders into 0.5:0.15:0.35. Herein, a tensile modulus of a mixing binder was 250 MPa.

Flexibility and capacity retention of the lithium secondary battery cell were measured according to the same method as Example 1, and the results are shown in Table 1.

7. Example 7

A lithium secondary battery cell was manufactured according to the same method as Example 1 except for changing the third binder into a vinylidene fluoride-tetrafluoroethylene (VdF-TFE) copolymer (a tensile modulus: 350 MPa) and the weight ratio of the first, second, and third binders into 0.4:0.35:0.25. Herein, a tensile modulus of a mixing binder was 420 MPa.

Flexibility and capacity retention of the lithium secondary battery cell were measured according to the same method as Example 1, and the results are shown in Table 1.

8. Example 8

A lithium secondary battery cell was manufactured according to the same method as Example 1 except for changing the third binder into a vinylidene fluoride-hexafluoro propylene (VdF-HFP)-acrylate copolymer (a tensile modulus: 200 MPa) and the weight ratio of the first, second, and third binders into 0.5:0.3:0.2. Herein, a tensile modulus of a mixing binder was 440 MPa.

Flexibility and capacity retention of the lithium secondary battery cell were measured according to the same method as Example 1, and the results are shown in Table 1.

9. Example 9

A lithium secondary battery cell was manufactured according to the same method as Example 1 except for changing the solid weight ratio of lithium cobalt oxide, carbon black, and a mixing binder into 97.4:1.2:1.4, using PVdF as the first binder and a VdF-HFP-acrylate copolymer (a tensile modulus: 200 MPa) as the third binder, and changing the weight ratio of the first, second, and third binders into 0.58:0.21:0.21. Herein, a tensile modulus of a mixing binder was 500 MPa.

Flexibility and capacity retention of the lithium secondary battery cell were measured according to the same method as Example 1, and the results are shown in Table 1.

10. Comparative Example 1

A lithium secondary battery cell was manufactured according to the same method as Example 1 except for changing the weight ratio of the first, second, and third binders into 0.4:0.6:0. In other words, Comparative Example 1 uses no third binder. Herein, a tensile modulus of a mixing binder was 300 MPa.

Flexibility and capacity retention of the lithium secondary battery cell were measured according to the same method as Example 1, and the results are shown in Table 1.

11. Comparative Example 2

A lithium secondary battery cell was manufactured according to the same method as Example 1 except for changing the weight ratio of the first, second, and third binders into 0.4:0:0.6. In other words, Comparative Example 2 used no second binder. Herein, a tensile modulus of a mixing binder was 400 MPa.

Flexibility and capacity retention of the lithium secondary battery cell were measured according to the same method as Example 1, and the results are shown in Table 1.

12. Comparative Example 3

A lithium secondary battery cell was manufactured according to the same method as Example 1 except for changing the weight ratio of the first, second, and third binders into 0.4:0:0.6. In other words, Comparative Example 3 used no second binder. Herein, a tensile modulus of a mixing binder was 300 MPa.

Flexibility and capacity retention of the lithium secondary battery cell were measured according to the same method as Example 1, and the results are shown in Table 1.

13. Comparative Example 4

A lithium secondary battery cell was manufactured according to the same method as Example 1 except for changing the weight ratio of the first, second, and third binders into 0.8:0.1:0.1. In other words, in Comparative Example 4, wt % of the first binder was 80 wt %, which was larger than 60 wt %. Herein, a tensile modulus of a mixing binder was 900 MPa due to a weight ratio size of the first binder.

Flexibility and capacity retention of the lithium secondary battery cell were measured according to the same method as Example 1, and the results are shown in Table 1.

TABLE 1

| | First binder | Second binder | Third binder | Modulus of third binder (MPa) | Binder mixing ratio(weight ratio) (first binder/second binder/third binder) | Modulus of mixing binder (MPa) | Capacity retention (%) | Flexibility |
|---|---|---|---|---|---|---|---|---|
| Example 1 | acrylic acid modified PVdF | hydrogenated NBR | VdF-TFE-HFP copolymer | 250 | 0.4/0.3/0.3 | 420 | 85 | ○ |
| Example 2 | acrylic acid modified PVdF | hydrogenated NBR | VdF-acrylate copolymer | 200 | 0.4/0.3/0.3 | 400 | 84 | ○ |
| Example 3 | acrylic acid modified PVdF-HFP copolymer | hydrogenated NBR | VdF-TFE-HFP copolymer | 250 | 0.4/0.3/0.3 | 350 | 84 | ○ |
| Example 4 | acrylic acid modified PVdF | hydrogenated NBR | VdF-TFE-HFP copolymer | 250 | 0.33/0.33/0.33 | 250 | 81 | ○ |
| Example 5 | acrylic acid modified PVdF | hydrogenated NBR | VdF-TFE-HFP copolymer | 250 | 0.5/0.35/0.15 | 450 | 83 | ○ |
| Example 6 | acrylic acid modified PVdF | hydrogenated NBR | VdF-TFE-HFP copolymer | 250 | 0.5/0.15/0.35 | 450 | 87 | ○ |
| Example 7 | acrylic acid modified PVdF | hydrogenated NBR | VdF-TFE copolymer | 350 | 0.4/0.35/0.25 | 420 | 83 | ○ |
| Example 8 | acrylic acid modified PVdF | hydrogenated NBR | VdF-HFP-acrylate copolymer | 200 | 0.5/0.3/0.2 | 440 | 84 | ○ |
| Example 9 | PVdF | hydrogenated NBR | VdF-HFP-acrylate copolymer | 200 | 0.58/0.21/0.21 | 500 | 87 | ○ |
| Comparative Example 1 | acrylic acid modified PVdF | hydrogenated NBR | — | — | 0.4/0.6/0 | 300 | 20 | ○ |
| Comparative Example 2 | acrylic acid modified PVdF | — | VdF-TFE-HFP copolymer | 250 | 0.4/0/0.6 | 400 | 20 | ○ |
| Comparative Example 3 | acrylic acid modified PVdF | — | VdF-acrylate copolymer | 200 | 0.4/0/0.6 | 300 | 20 | ○ |
| Comparative Example 4 | acrylic acid modified PVdF | hydrogenated NBR | VdF-TFE-HFP copolymer | 250 | 0.8/0.1/0.1 | 900 | immeasurable | X |

Referring to the results of Table 1, Example 1 to 9 improved characteristics of the non-aqueous electrolyte secondary battery 1 as well as maintain flexibility of the positive active material layer 12.

Accordingly, the cells of Comparative Examples 1 to 3 not including a second or third binder in a mixing binder showed equivalent flexibility to the cells of Examples 1 to 9, and accordingly, the results were sufficient. However, Comparative Examples 1 to 3 showed sharply deteriorated battery characteristics.

Since a mixing binder used in Comparative Example 4 was extremely hard, the positive current collector 11 was broken in the flexibility evaluation.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: non-aqueous electrolyte secondary battery
1*a*: winding element for a lithium secondary battery
10: positive electrode
11: positive current collector 12: positive active material layer
20: separator
30: negative electrode
31: negative current collector
32: negative active material layer

The invention claimed is:

1. A positive electrode for a lithium secondary battery, comprising
a positive active material; and
a mixing binder including a first binder, a second binder, and a third binder, the first binder comprises acid-modified polyvinylidene fluoride, wherein the acid is acrylic acid, and
the mixing binder comprises the first binder at a proportion of 30 to 60 wt % relative to the total weight of the mixing binder, and has a tensile modulus of 200 MPa to 600 MPa,
wherein the mixing binder comprises the second binder at a proportion of 30 to 40 wt % relative to the total weight of the mixing binder,
wherein the third binder is at least one selected from the group consisting of a vinylidene fluoride-tetrafluoroethylene-hexafluoro propylene copolymer, a vinylidene fluoride-acrylate copolymer, a vinylidene fluoride-hexafluoro propylene-acrylate copolymer, a vinylidene fluoride-tetrafluoroethylene-acrylate copolymer, and a vinylidene fluoride-tetrafluoroethylene-hexafluoro propylene-acrylate copolymer.

2. The positive electrode for a lithium secondary battery of claim 1, wherein the first binder comprising the acid-modified polyvinylidene fluoride comprises at least one monomer selected from the group consisting of tetrafluoroethylene, hexafluoro propylene, and chlorotrifluoroethylene.

3. The positive electrode for a lithium secondary battery of claim 1, wherein the second binder is a hydrogenated acrylonitrile butadiene rubber.

4. The positive electrode for a lithium secondary battery of claim 1, wherein the third binder has a tensile modulus of 150 MPa to 600 MPa.

5. A winding element for a lithium secondary battery comprising the positive electrode of claim 1.

6. A lithium secondary battery comprising the winding element for a lithium secondary battery of claim 5.

* * * * *